United States Patent [19]
Scarelli

[11] Patent Number: 5,633,775
[45] Date of Patent: May 27, 1997

[54] FIRE SENTRY POWER CABLE

[76] Inventor: David F. Scarelli, 193 Alpine Knoll, Fairport, N.Y. 14450

[21] Appl. No.: 645,528

[22] Filed: May 14, 1996

[51] Int. Cl.$^6$ .................................................. H02H 5/04
[52] U.S. Cl. ......................... 361/103; 361/108; 361/115
[58] Field of Search ................................. 361/103, 104, 361/106, 115, 108; 174/113 R, 115

[56] References Cited

U.S. PATENT DOCUMENTS 3,912,903  10/1975  Northrup ................................ 219/375
4,547,658  10/1985  Crowley ................................. 219/539

*Primary Examiner*—Jeffrey A. Gaffin
*Assistant Examiner*—Stephen Jackson
*Attorney, Agent, or Firm*—Robert J. Bird

[57] ABSTRACT

Power cable includes, along with standard conductor wires encased in insulation, a heat responsive cable alongside the conductor wires. The heat responsive cable includes helically wound wires each coated with heat sensitive dielectric. The two wound wires at one end are oppositely connected to an alarm and to a main power switch, forming a normally open safety circuit. The dielectric on the heat responsive cable is subject to vaporization in response to a fault in the power cable, whereby the wound wires make electrical contact to close the safety circuit, activate the alarm, and open the main power switch.

2 Claims, 2 Drawing Sheets

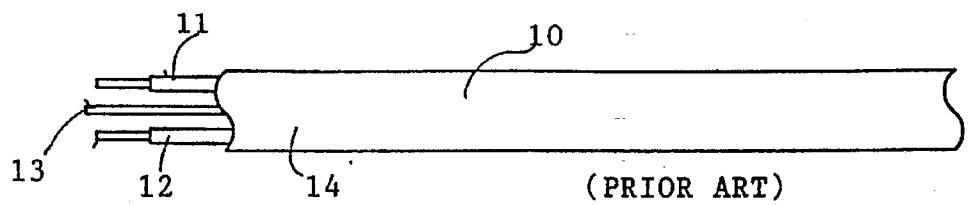
FIG. 1
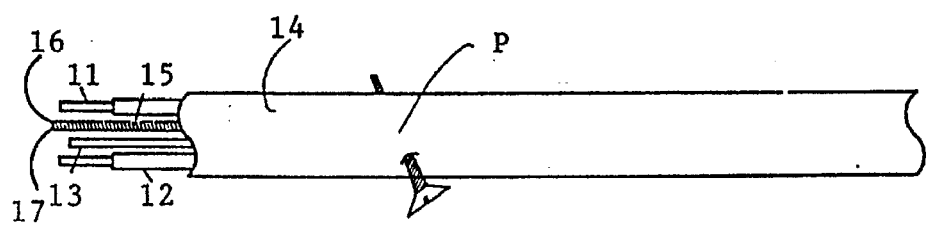
FIG. 2
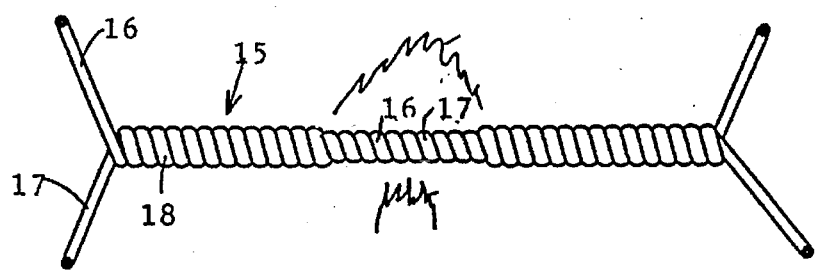
FIG. 3
FIG. 5
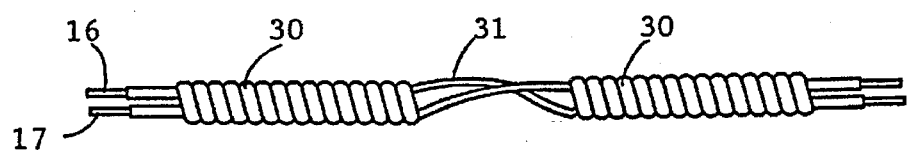

FIRE SENTRY POWER CABLE

FIELD OF THE INVENTION

This invention relates to electrical wiring, and more particularly to a cable assembly which is responsive to high temperature to activate an alarm and to shut off power.

BACKGROUND AND INFORMATION DISCLOSURE

U.S. Pat. No. 3,774,184 on a "Heat Responsive Cable Assembly" was issued to me on Nov. 20, 1973. It discloses a pair of helically wound wires, each coated with heat sensitive insulation. In the event of a local high temperature condition, the wire insulation is vaporized in response to the high temperature, the two wires come into contact. The crossed wires close a circuit to activate an alarm. The geometry of the helix is also a factor in the thermal response of the device. The disclosure of that patent is incorporated herein by reference.

The heat responsive cable described in my earlier U.S. Pat. No. 3,774,184 was intended for installation by itself, within the walls of a house for example, as a means of fire detection and alarm. As originally contemplated in that earlier patent, my heat responsive cable required its own installation, separate from and independent of the electrical power cables installed within the same walls.

The cable described herein is both an extension and an improvement of my earlier heat responsive cable invention.

It is an object of this invention to provide a safety circuit along the length of a power cable.

SUMMARY OF THE INVENTION

Power cable according to this invention includes, along with standard conductor wires encased in insulation, a heat responsive cable alongside the conductor wires. The heat responsive cable includes helically wound wires each coated with heat sensitive dielectric. The two wound wires at one end are oppositely connected to an alarm and to a main power switch, forming a normally open safety circuit. The dielectric on the heat responsive cable is subject to vaporization in response to a fault in the power cable, whereby the two wound wires make electrical contact to close the safety circuit, activate the alarm, and open the main power switch.

DRAWING

FIG. 1 represents a standard power cable of the prior art.

FIG. 2 represents a power cable according to this invention.

FIG. 3 is an enlarged detail view of a section of heat responsive cable.

FIG. 5 is an enlarged detail view of a heat responsive cable showing another feature thereof.

DESCRIPTION

Figure 4:
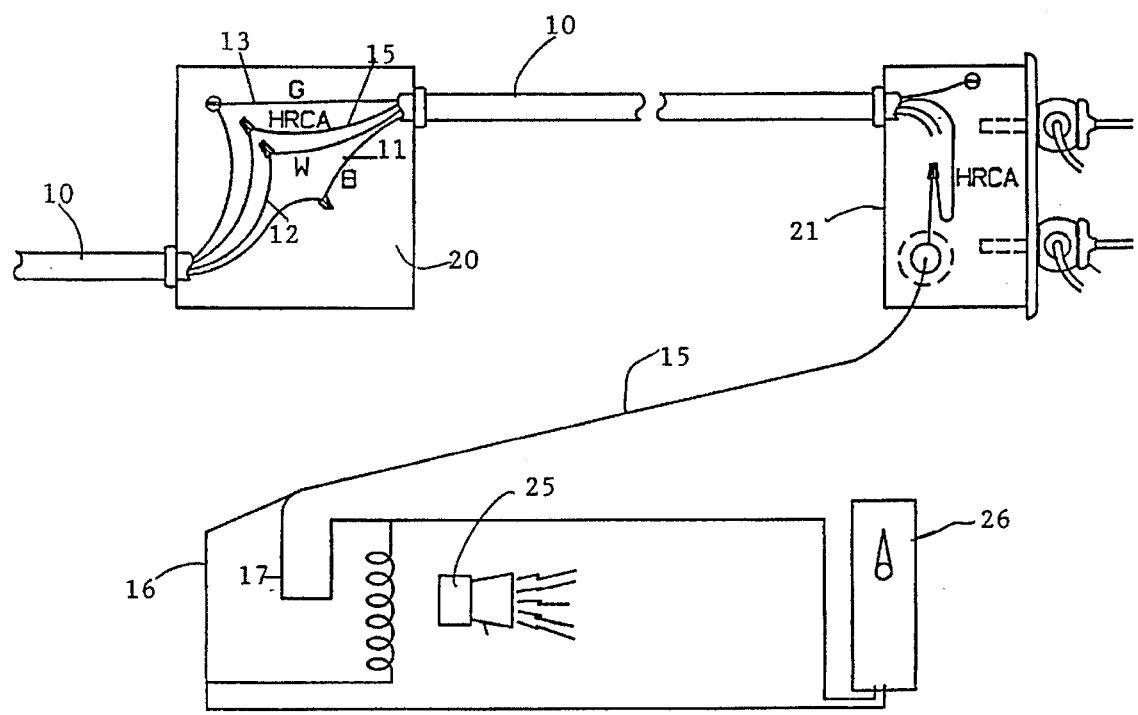
FIG. 4 is an electrical diagram of the power cable and safety circuit.

Referring now to the drawing, FIG. 1 shows a standard power cable of the prior art, including a black wire 11, white wire 12, and ground wire 13, all encased in a plastic insulation 14.

FIG. 2 shows a power cable 10 according to this invention, including a black wire 11, white wire 12, ground wire 13, and heat responsive cable 15, all encased in a plastic insulation 14. The heat responsive cable 15, shown in better detail in FIG. 3, includes a pair of helically wound wires 16, 17 each thinly coated with polyurethane insulation 18, or similar heat sensitive dielectric material. FIG. 3 indicates heat immediately below the cable 15, and vaporized insulation immediately above it. The center section of the heat responsive cable 15 is now without insulation, and the wires 16, 17 at that location are bare and in contact with each other.

FIG. 4 represents a house wiring system including power cable 10 and electrical boxes 20. The heat responsive cable 15 extends from the distribution box 21 to an alarm 25 and to a main power switch 26. The two wires 16, 17 of the cable 15 are insulated from each other along their entire length, and their remote ends (not shown) are separated. Thus, the circuit including wires 16, 17, alarm 25, and power switch 26 is normally open.

Power cables are subject to damage from various sources. Insulation can be faulty or deteriorated. Rodents chew on insulation. Nails or screws are sometimes driven into cables. These things can cause electrical faults.

FIG. 2 shows a screw accidentally driven through the cable 10 at a point P to represent a fault site. A fault such as a short circuit at a point P along the length of the power cable 10 produces a local high temperature condition. Insulation 18 on wires 16, 17 of the heat responsive cable 15 adjacent to the fault site is vaporized by the high temperature. The wires 16, 17 make contact and a closed circuit to activate the alarm 25 and open the power switch 26.

Inclusion of the heat responsive cable 15 into the power cable 10 provides a safety feature for the power cable along its entire length. Having the cable 15 within the power cable 10 also facilitates its very installation. It is now part of the power cable 10.

FIG. 5 shows another feature of this invention. The earlier form of my heat responsive cable 15 is shown in FIG. 3. It is a rather tightly wound helix of small wires. Working with it can be difficult if there are many cuts to be made. The cut ends of the small tightly wound helix are difficult to grasp and work with. The worker must first separate the ends before doing anything with them. By comparison the heat responsive cable 15 of FIG. 5 includes sections of wound wire 30 alternating with sections of straight wire 31. With the heat responsive cable 15 in this form, a worker can easily find a straight wire section 31 and cut the cable 15 there, giving him two free ends of wires 16, 17 to work with.

The foregoing description of a preferred embodiment of this invention, including any dimensions, angles, or proportions, is intended as illustrative. The concept and scope of the invention are limited only by the following claims and equivalents thereof.

What is claimed is:

1. A power cable, including:

conductor wires encased in insulation;

a separate heat responsive cable encased in said insulation along the length of said conductor wires, said heat responsive cable including a pair of wires each coated with a heat sensitive dielectric material, said heat responsive cable including sections in which said wires are helically wound on each other, alternating with sections of straight wire to facilitate separation of ends of said wires upon cutting said cable:

said ends being adapted for connection to an alarm and to a main power switch in a normally open safety circuit;

said dielectric material on said wound wires being subject to vaporization, in response to heat from a fault in said power cable, to connect said wound wires and close said safety circuit.

2. An electrical cable, including:

conductor wires disposed in conduit;

a separate heat responsive cable disposed in said conduit along the length of said conductor wires, said heat responsive cable including a pair of wires each coated with a heat sensitive dielectric material, said heat responsive cable including sections in which said wires are helically wound on each other, alternating with sections of straight wire to facilitate separation of ends of said wires upon cutting said cable;

said ends being adapted for connection to an alarm and to a main power switch in a normally open safety circuit;

said dielectric material on said wound wires being subject to vaporization, in response to heat from a fault in said power cable, to connect said wound wires and close said safety circuit.

* * * * *